(12) United States Patent
Hoang et al.

(10) Patent No.: US 11,948,110 B2
(45) Date of Patent: Apr. 2, 2024

(54) SYSTEM FOR MANAGING PERFORMANCE OF A SERVICE ESTABLISHMENT

(71) Applicant: i3 International Inc., Toronto (CA)

(72) Inventors: Jack Hoang, Toronto (CA); Andrew Hoang, Toronto (CA)

( * ) Notice: Subject to any disclaimer, the term of this patent is extended or adjusted under 35 U.S.C. 154(b) by 151 days.

(21) Appl. No.: 16/775,717

(22) Filed: Jan. 29, 2020

(65) Prior Publication Data

US 2021/0233005 A1 Jul. 29, 2021

(51) Int. Cl.
| | |
|---|---|
| *G06Q 10/0631* | (2023.01) |
| *G06F 16/783* | (2019.01) |
| *G06N 5/025* | (2023.01) |
| *G06Q 30/02* | (2023.01) |
| *G06Q 30/0601* | (2023.01) |

(Continued)

(52) U.S. Cl.
CPC ..... *G06Q 10/06315* (2013.01); *G06F 16/784* (2019.01); *G06N 5/025* (2013.01); *G06Q 30/0281* (2013.01); *G06Q 30/0633* (2013.01); *G06Q 50/12* (2013.01); *G06T 7/292* (2017.01); *G06V 20/40* (2022.01); *G06V 40/10* (2022.01); *G07C 11/00* (2013.01); *H04N 7/18* (2013.01); *H04N 23/54* (2023.01); *H04N 23/90* (2023.01); *G06T 2207/10016* (2013.01); *G06T 2207/30196* (2013.01); *G06T 2207/30248* (2013.01); *G07C 2011/04* (2013.01)

(58) Field of Classification Search
None
See application file for complete search history.

(56) References Cited

U.S. PATENT DOCUMENTS 4,392,119 A * 7/1983 Price ............... G06Q 30/06
340/941
5,377,097 A * 12/1994 Fuyama ............ G06Q 30/0601
705/26.1

(Continued)

FOREIGN PATENT DOCUMENTS

JP 2007128386 A * 5/2007

OTHER PUBLICATIONS

Iqbal et al. "Reducing Customer Wait Time at a Fast Food Restaurant on Campus" (2012) (https://www.researchgate.net/publication/271938053_Reducing_Customer_Wait_Time_at_a_Fast_Food_Restaurant_on_Campus) (Year: 2012).*

*Primary Examiner* — Sujay Koneru
(74) *Attorney, Agent, or Firm* — Kagan Binder, PLLC

(57) ABSTRACT

A system for managing performance of a service establishment, the service establishment having multiple servers and multiple customers. Each server has a server queue with zero or more customers. Servers take orders from customers when they reach the head of the server's queue. The system includes: an order input interface for obtaining orders from the servers as the servers take orders from the customers; one or more digital video cameras positioned and configured to capture video of the server queues; a public view monitor viewable by the customers; a management monitor viewable by one or more managers of the service establishment; and a customer tracking processor. The customer tracking processor is configured to: receive video of server queues; identify customers in the video data; track customer progress in the server queues; and calculate and display expected wait times of the server queues on the public view monitor.

10 Claims, 4 Drawing Sheets

(51) Int. Cl.

| | |
|---|---|
| *G06Q 50/12* | (2012.01) |
| *G06T 7/292* | (2017.01) |
| *G06V 20/40* | (2022.01) |
| *G06V 40/10* | (2022.01) |
| *G07C 11/00* | (2006.01) |
| *H04N 7/18* | (2006.01) |
| *H04N 23/54* | (2023.01) |
| *H04N 23/90* | (2023.01) |

(56) References Cited

U.S. PATENT DOCUMENTS

| | | | | |
|---|---|---|---|---|
| 5,978,772 | A * | 11/1999 | Mold | A47F 9/046 |
| | | | | 705/16 |
| 6,842,719 | B1 * | 1/2005 | Fitzpatrick | G06Q 10/06 |
| | | | | 702/182 |
| 10,282,763 | B1 * | 5/2019 | Sulejmani | H04W 4/026 |
| 10,540,711 | B1 * | 1/2020 | Gau | G06Q 30/0601 |
| 10,943,311 | B1 * | 3/2021 | Svenson | G06Q 30/0601 |
| 11,127,054 | B1 * | 9/2021 | Sulejmani | H04W 4/029 |
| 2004/0158494 | A1 * | 8/2004 | Suthar | G06Q 30/06 |
| | | | | 705/15 |
| 2005/0198107 | A1 * | 9/2005 | Cuhls | G06Q 30/0281 |
| | | | | 186/35 |
| 2006/0221236 | A1 * | 10/2006 | Cheng | H04N 21/47 |
| | | | | 348/553 |
| 2008/0290182 | A1 * | 11/2008 | Bell | G06Q 10/04 |
| | | | | 705/7.31 |
| 2008/0319935 | A1 * | 12/2008 | Chandak | G06Q 10/109 |
| | | | | 706/45 |
| 2009/0076875 | A1 * | 3/2009 | Lert, Jr. | G07C 11/00 |
| | | | | 705/14.3 |
| 2009/0097739 | A1 * | 4/2009 | Rao | G06F 18/254 |
| | | | | 382/159 |
| 2009/0268028 | A1 * | 10/2009 | Ikumi | H04N 7/181 |
| | | | | 348/150 |
| 2009/0313062 | A1 * | 12/2009 | Natsuyama | G06Q 30/02 |
| | | | | 705/14.1 |
| 2010/0325000 | A1 * | 12/2010 | Teraoka | G06Q 30/02 |
| | | | | 705/15 |
| 2011/0225032 | A1 * | 9/2011 | Kobres | G06Q 30/06 |
| | | | | 715/764 |
| 2011/0258011 | A1 * | 10/2011 | Burns | G06Q 50/12 |
| | | | | 705/15 |
| 2012/0296686 | A1 * | 11/2012 | Fugman | H04M 3/42348 |
| | | | | 705/26.61 |
| 2013/0030874 | A1 * | 1/2013 | Lin | G06Q 10/06 |
| | | | | 705/7.38 |
| 2013/0138515 | A1 * | 5/2013 | Taniguchi | G06Q 30/0635 |
| | | | | 705/15 |
| 2013/0332509 | A1 * | 12/2013 | Schwartz | G07C 11/00 |
| | | | | 709/203 |
| 2014/0063263 | A1 * | 3/2014 | Bernal | H04N 5/23296 |
| | | | | 348/169 |
| 2015/0287108 | A1 * | 10/2015 | Monk | G07F 17/42 |
| | | | | 705/5 |
| 2016/0048894 | A1 | 2/2016 | Kaiser | |
| 2016/0155328 | A1 * | 6/2016 | Bernal | G06Q 10/04 |
| | | | | 382/104 |
| 2016/0171566 | A1 * | 6/2016 | Pugh | G06Q 30/0281 |
| | | | | 705/346 |
| 2016/0247113 | A1 * | 8/2016 | Rademaker | G06Q 10/083 |
| 2016/0292664 | A1 * | 10/2016 | Gilfoyle | G06Q 10/08 |
| 2016/0350838 | A1 * | 12/2016 | Tsao | G06Q 30/0643 |
| 2016/0364661 | A1 * | 12/2016 | Hurst | G11B 27/34 |
| 2017/0018041 | A1 * | 1/2017 | Fox | G06Q 20/3224 |
| 2017/0098264 | A1 * | 4/2017 | Priebatsch | H04L 67/52 |
| 2017/0178084 | A1 * | 6/2017 | Barreira Avegliano | |
| | | | | G06Q 10/1097 |
| 2018/0075404 | A1 * | 3/2018 | Hendrickson | G06Q 50/30 |
| 2018/0211300 | A1 * | 7/2018 | Tovey | G06Q 90/20 |
| 2018/0247381 | A1 * | 8/2018 | Cronin | G06Q 20/202 |
| 2018/0260864 | A1 * | 9/2018 | Leclercq | G06Q 50/01 |
| 2018/0268358 | A1 * | 9/2018 | Alden | G07C 9/00174 |
| 2019/0130173 | A1 * | 5/2019 | Udagawa | B25J 11/008 |
| 2019/0130322 | A1 * | 5/2019 | Chen | G06Q 10/109 |
| 2019/0139258 | A1 * | 5/2019 | Slattery | G06V 20/52 |
| 2019/0385173 | A1 * | 12/2019 | Johnsen | G06V 20/52 |
| 2020/0104757 | A1 * | 4/2020 | Molinari | G06Q 30/0631 |
| 2020/0207572 | A1 * | 7/2020 | Jarugubilli | B66B 1/3461 |
| 2020/0226523 | A1 * | 7/2020 | Xu | G06T 7/254 |
| 2020/0279279 | A1 * | 9/2020 | Chaudhuri | G10L 25/63 |
| 2020/0365002 | A1 * | 11/2020 | Modiano | A61B 5/7405 |
| 2021/0103941 | A1 * | 4/2021 | Patil | G06Q 30/0202 |
| 2021/0166041 | A1 * | 6/2021 | Laganière | G06T 7/194 |
| 2021/0192592 | A1 * | 6/2021 | Callaerts | G06K 7/10297 |
| 2021/0233005 | A1 * | 7/2021 | Hoang | G06Q 30/0281 |

* cited by examiner

SYSTEM FOR MANAGING PERFORMANCE OF A SERVICE ESTABLISHMENT

FIELD OF THE INVENTION

The present invention relates generally to systems for managing performance of a service establishment, and more particularly to managing performance of a service establishment having a plurality of server and a plurality of customers using an order input interface, one or more digital video cameras, a public view monitor, a management monitor and a customer tracking processor.

BACKGROUND OF THE INVENTION

The service industry plays a significant role in county's economies. This sector of the economy is made up of companies that primarily earn revenue through providing intangible products and services. Service industry companies are involved in retail, transport, distribution, food services, as well as other service-dominated businesses. Quick service restaurants, physical retail, and many other establishments in the service industry employ queues in order to efficiently serve their customers. The efficiency and the effectiveness of these queues are often a key driver of performance for these businesses. Queue time can impact a customer's decision as to whether to stay and make a purchase or leave the establishment. Long waits lead to lower sales.

There is an identified need to improve service queue performance, yet prior art systems have been inadequate in addressing this need. Various systems capture and process video to identify customers and calculate queue information using known techniques. This queue information is then displayed or otherwise distributed to the service establishment employees and management. However, this approach has been proven to be limited. Customers are not provided this information and are not able to take action. Likewise, management of the service establishment is not provided this information in a timely manner, or in a manner that allows for them to take actionable steps to improve performance.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides a system for managing the performance of a service establishment having multiple servers and multiple customers, such as a quick service restaurant or a retail store. Each server is associated with a queue containing zero or more customers where each server takes orders from customers at the head of the server queue as each customer reaches the head of the queue. The system includes an order input interface, one or more digital video cameras, a public view monitor, a management monitor and a customer tracking processor. The system may further include a rules-based recommendations engine wherein the recommendations engine is configured to recommend to restaurant managers adjusting staffing levels to achieve a target average wait time.

The service establishment may be a restaurant with a drive-in queue located outside of and proximate to the restaurant. A drive-in order station is located proximate to the head of the drive-in queue and has a drive-in cashier located therein. The drive-in queue may have multiple vehicles in it, with each vehicle having a driver. When each vehicle reaches the head of the drive-in queue the drive-in cashier takes a food order from the driver of the vehicle and enters the food order via the order input interface. The order input interface is used for obtaining orders from the servers as the servers takes orders from the customers.

The one or more digital video cameras are positioned and configured to capture video of the server queues. One of the digital video cameras may be a drive-in video camera positioned and configured to capture drive-in video data of the vehicles in the drive-in queue and provide the drive-in video data to the customer tracking processor.

The customer tracking processor is configured to receive video data, identify customers and servers, track customer progress and calculate and display wait times for the server queues. The customer tracking processor receives video data, for each server queue, from at least one of the digital video cameras. The customer tracking processor may also be configured to receive drive-in video data from the drive-in video camera of the drive-in queue and track each vehicle's progress in the drive-in queue by analysis of the drive-in video data.

The customer tracking processor uses the video data to identify customers and the server in each server queue and tracks each customer's progress in the server queue by analysis of the video data. The customer tracking processor may also be configured to calculate the following metrics:

the number of customers in each server queue;

an average order time for each customer in the server queue who ordered within a predetermined period of time, where the order time is the duration between the time the customer reaches the head of the server queue and the time the customer's order is entered into the system;

an expected wait time for each server queue, wherein the expected wait time is calculated as the average order time for the server queue multiplied by the number of customers in the server queue each customer's wait time from the time the customer enters the server queue until the time the server take the customer's order and enters the order via the order input interface;

the average customer wait time for each server queue as the average of the customer wait times for customers in the server queue who ordered within a previous predetermined period of time;

the number of customers in the drive-in queue;

an average drive-in order time for each vehicle in the drive-in queue who ordered within a previous predetermined period of time, where the drive-in order time is the duration between the time the vehicle reaches the head of the drive-in queue and the time the driver's order is entered into the order input interface;

an expected drive-in wait time for the drive-in queue, where the expected drive-in wait time for the drive-in queue is calculated as the average drive-in order time for the drive-in queue multiplied by the number of vehicles in the drive-in queue;

each vehicle's drive-in wait time, by analysis of the drive-in video data, where the drive-in wait time for each vehicle in the drive-in is calculated as the time from when the vehicle enters the drive-in queue until the time the drive-in cashier takes the food order of the driver of the vehicle and enters the food order via the order input interface; and the average vehicle wait time for each drive-in queue as the average of the vehicle wait times for vehicles in the drive-in queue who ordered within a previous predetermined period of time.

For calculations where there is a first customer at the head of a server queue with a second customer immediately behind the first customer in the server queue, the time the server takes the first customer's order and enters the order via the order input interface may be deemed to be the time that the second customer reaches the head of the server queue.

The customer tracking processor may also be configured to display any calculated metrics on either the public view monitor, including any exterior monitor, or the management monitor, or both. The customer tracking processor may be configured to display, on the management monitor, video of the customers in the server queues received from the digital video cameras, and, for each customer in a server queue, the duration of time that the customer has been in the server queues.

The customer tracking processor may also be further configured to calculate, for each server queue, by analyzing the video data, the number of customers in the server queue and an average order time for each customer in the server queue who have ordered within a predetermined period of time. The order time is the duration between the time the customer reaches the head of the server queue and the time the customer's order is entered into the system. The expected wait time for a server queue is calculated as the average order time for the server queue.

The public view monitor is viewable by the customers and displays the expected wait time for each server queue. The public view monitor may also be configured to display any metrics that are calculated by the customer tracking processor. An exterior monitor viewable by drivers of vehicles approaching the service establishment prior to entering the drive-in queue may also be included.

The management monitor is viewable by one or more managers of the service establishment. The management monitor may be configured to display video of the customers in the server queues received from the digital video cameras, and, for each customer, the duration of time that the customer has been in one of the server queues. The management monitor may also be configure to display metrics calculated by the customer tracking processor including:

the average customer wait time for each server queue or an average wait time for all the server queues; and the average drive-in wait time each vehicle in a drive-in queue.

The management monitor may also be configured to display recommendations provided by the rules-based engine to adjust staffing levels to achieve a target average wait time.

DETAILED DESCRIPTION OF THE INVENTION

For quick service restaurants, and many retail stores, the performance of the establishment is highly related to their service queues. Shorter queue times means that customers spend less time waiting to interact and be served by a server. To address queue times, the present disclosure describes a system for managing the performance of service establishments that employ service queues such as quick service restaurants and retail stores.

Figure 1:
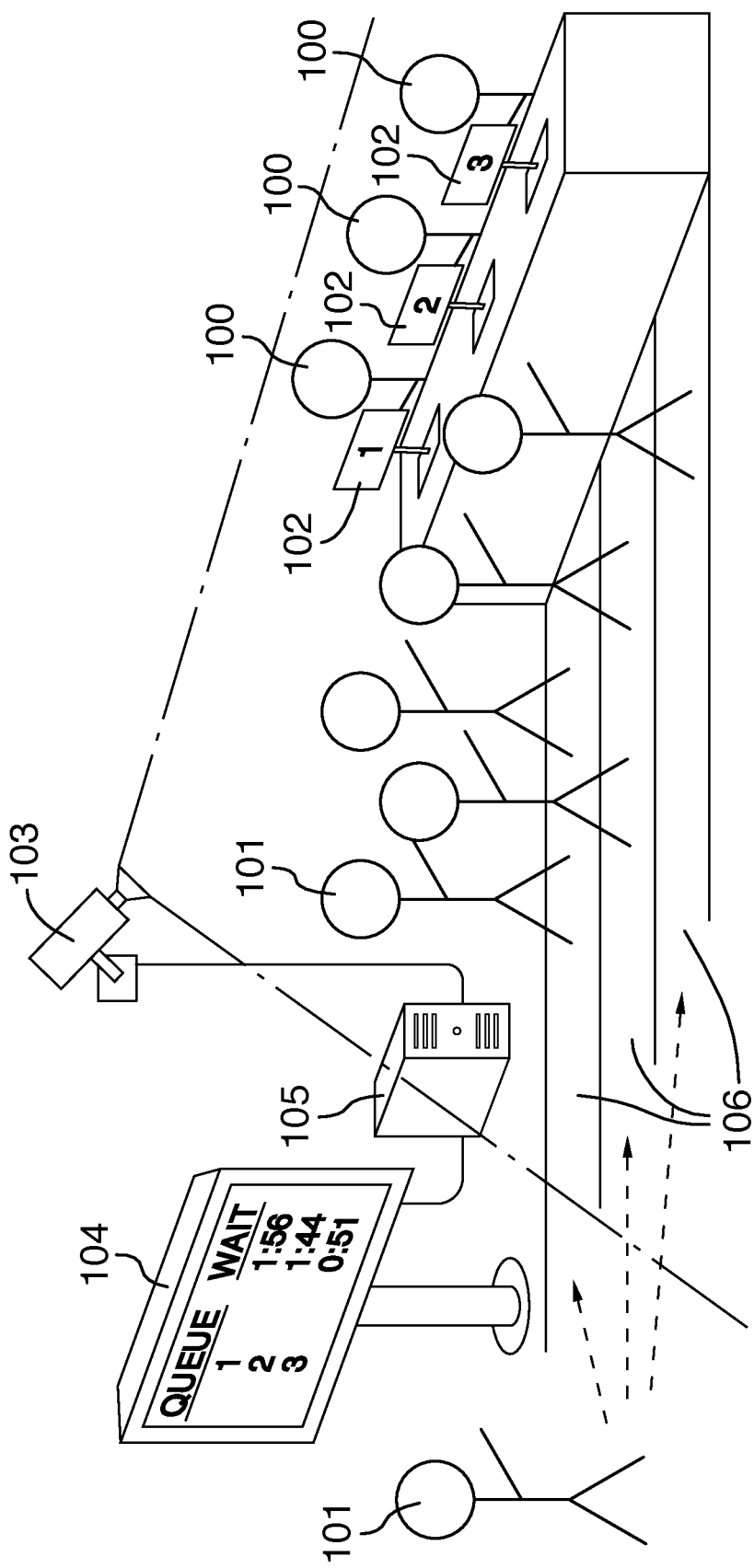
FIG. 1 is a perspective view of the interior of an establishment operating a preferred embodiment of the system.

A preferred embodiment of the system operating at a service establishment is shown in FIG. 1. The invention is a system for managing performance of a service establishment having multiple servers 100 and multiple customers 101. The system includes an order input interface 102, one or more digital video cameras 103, a public view monitor 104, a management monitor and a customer tracking processor 105.

Referring to FIG. 1, a customer 101 is depicted entering the service establishment. When he or she enters, the customer 101 is presented with wait time information displayed on a public view monitor 104. The public view monitor 101 may also display additional server queue related metrics. Based on the information displayed by the public view monitor 104, the customer chooses which server queue 106 to enter, or not to enter a queue whatsoever.

Each server queue 106 is associated with a server 100. In some cases multiple servers 100 may be associated with a server queue 106. The server queues are processed on a first in first out basis. Customers select a queue 106 and enter the tail of the queue 106 and exit at the head of the same queue. Once at the head, the customer 101 is served by the server 100 associated with that queue. The server 100 serves each customer 101 by taking his or her order and entering the order in an order input terminal 102 to record the customer's order information.

After a customer 101 enters a server queue, the customer's presence and progress through the queue are tracked by one or more digital video cameras 103, each of which may be identical. These cameras 103 capture video of the servers 100 and the server queues, which is provided to a customer tracking processor 105. An AI camera may be employed which performs some of the functions otherwise performed by the customer tracking processor 105. The customer tracking processor 105 receives the video of the servers 100 and server queues 106 and analyzes the video to, for each server queue 106:

1) identify each customer 101 in the server queue 106;
2) track each customer's progress through the server queue 106; and
3) calculate server queue related metrics such as the expected wait time.

The customer tracking processor 105 may also receive customer order information which may also be used to compute customer and queue related metrics.

In the preferred embodiment depicted by FIG. 1, the customer tracking processor 105 operates software which makes use of an artificial intelligence engine to detect human heads and vehicles. Use of this engine enables customer identification with a single 360-degree camera. The artificial intelligence engine employs an optimized convolutional neural network framework which can detect 23 object categories from video. The convolutional neural network is trained with thousands of head and vehicle samples from multiple views allowing customers and vehicles to be reliably identified.

Once identified, customers may be tracked through the server queue 106 by repeatedly identifying the customer 101 and recording the time of identification and the customer's position in the queue 106. This information may be further analyzed to calculate queue related metrics. In certain instances, the convolutional neural network may fail to recognize the customer and the software may have to rely on other techniques known in the art to estimate the customer's position.

Figure 2:
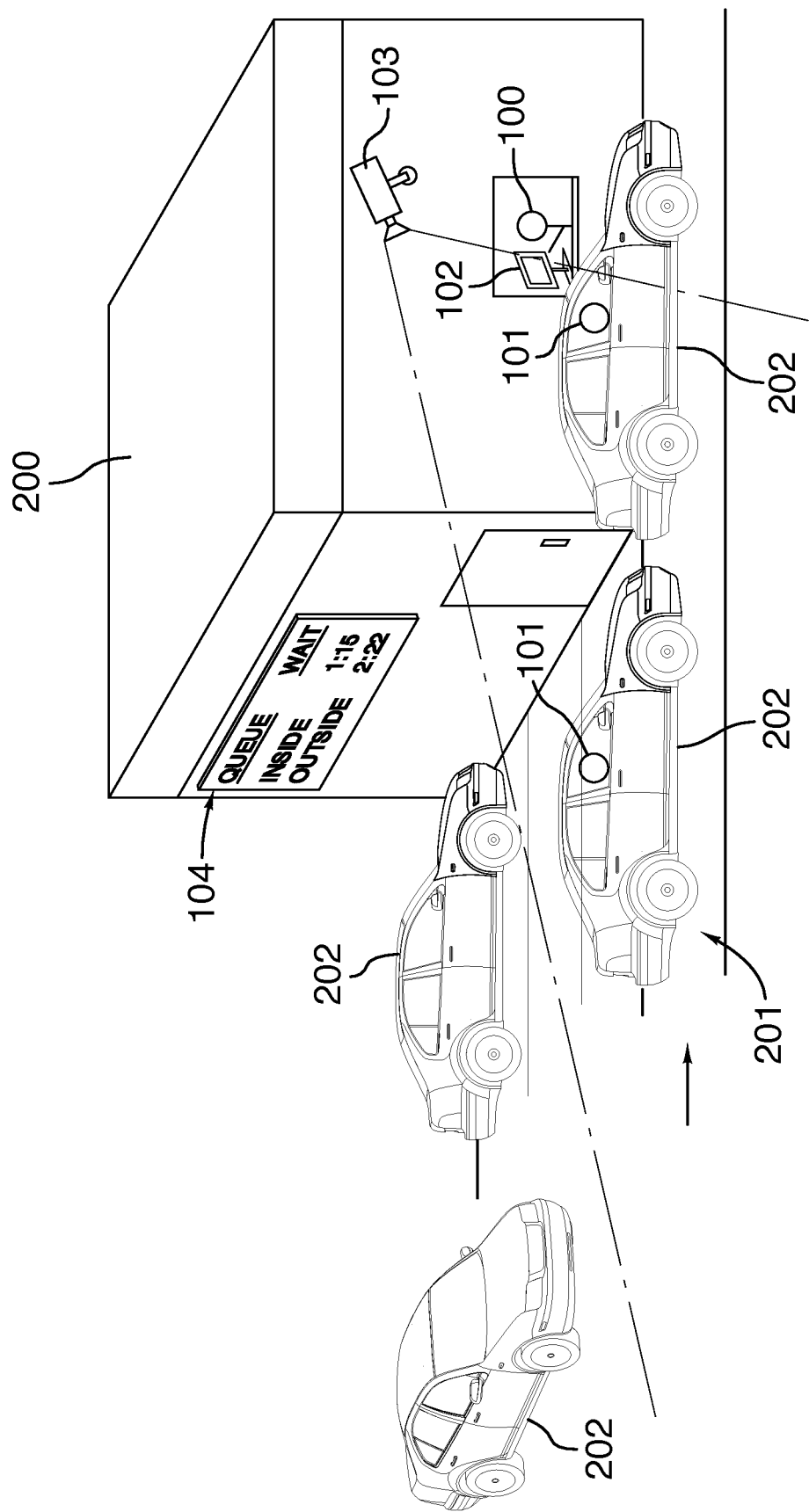
FIG. 2 is a perspective view of the exterior of the establishment having a drive-in queue, the establishment operating a preferred embodiment of the system.

Referring to FIG. 2, a partial exterior view of the service establishment 200 of the preferred embodiment is depicted. There is drive-in queue 201 in addition to the interior queues shown in FIG. 1. There are four vehicles 202, two in the drive-in queue, one in the parking lot, and one approaching the service establishment 200. The driver of the vehicle 202 approaching the service establishment is presented with an exterior public view monitor 104 outside of the service establishment 200. The exterior monitor 104 displays the minimum estimated time for the interior server queues 106 and the estimated wait time for the drive-in queue 201. In other preferred embodiments, wait times for any or all of server queues may be displayed. Other queue related metrics may also be displayed.

Based on the information displayed on the exterior monitor 104, the vehicle driver may choose whether to park his or her vehicle 202 and join an interior server queue 106 or to enter the drive-in queue 201 for service. If a customer 101 enters a queue (server or drive-in), the customer's presence and progress through the queue is tracked by one or more video cameras 103. These cameras capture video of the drive-in queue 201 and provide the video to the customer tracking processor 105 so that the customer tracking processor 105 can identify each vehicle 202 in the drive-in queue, track the vehicle's progress through the drive-in queue or the customer's progress through the server queue, and calculate queue related metrics such as the expected wait time. Some or all of these metrics may be displayed on the exterior monitor 104 or a management monitor 300 or both.

Figure 3:
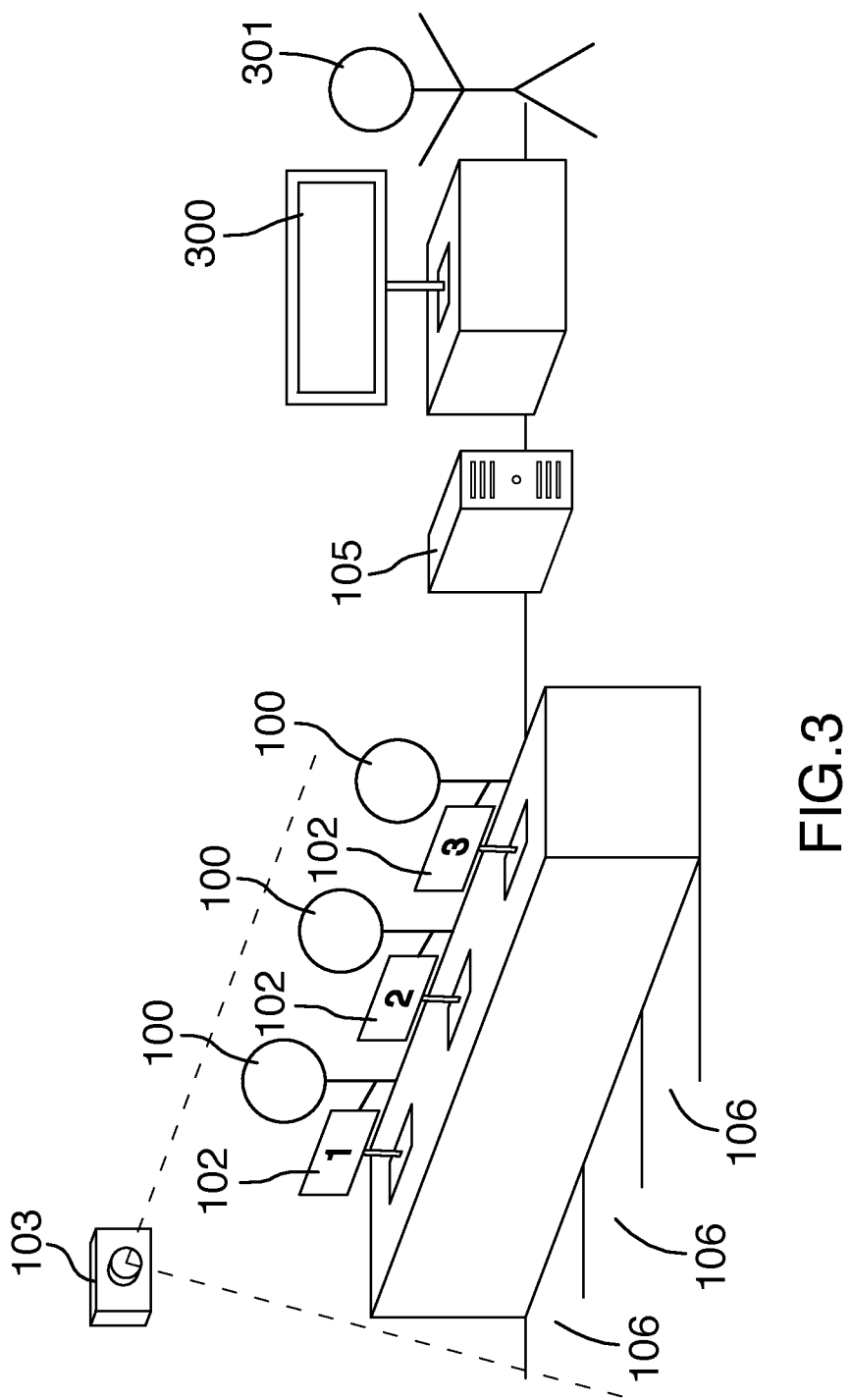
FIG. 3 is another partial perspective view of the interior of the establishment operating a preferred embodiment of the system.

Referring to FIG. 3, a partial interior view of the service establishment 200 of the preferred embodiment is depicted. There is a management monitor 300 viewable by a manager 301. The management monitor 300 displays queue related metrics such as the average customer wait time for each server queue 106 and drive-in queue 201. The management monitor 300 may also display video of the customers 101 in the server queues 106. Video and queue related metrics may be shown alone or in combination with each other.

Each customer's presence and progress through the server queues 106 and vehicles 202 in the drive-in queue 201 is tracked by a video camera 103. Video of the servers 100 and the server queues 106 are captured by a digital video camera 103 and provided to a customer tracking processor 105 for analysis. The customer tracking processor 105 receives the video of the servers 100 and server queues 106 and analyzes the video to identify customers 101, calculate queue related metrics and display the metrics on a public view monitor 104 or management monitor 300. The customer tracking processor 105 may also include a rules-based recommendations engine configured to provide recommendations as how to adjust staffing levels to achieve a target average wait time. These recommendations may be provided to restaurant managers 301 by displaying the recommendations on the management monitor 300. Color coding may also be implemented to highlight metrics and recommendations based on predefined criteria. For instance, green may be used to highlight metrics that exceed targets while red may be used to highlight metrics not meeting or achieving a goal or target.

Figure 4:
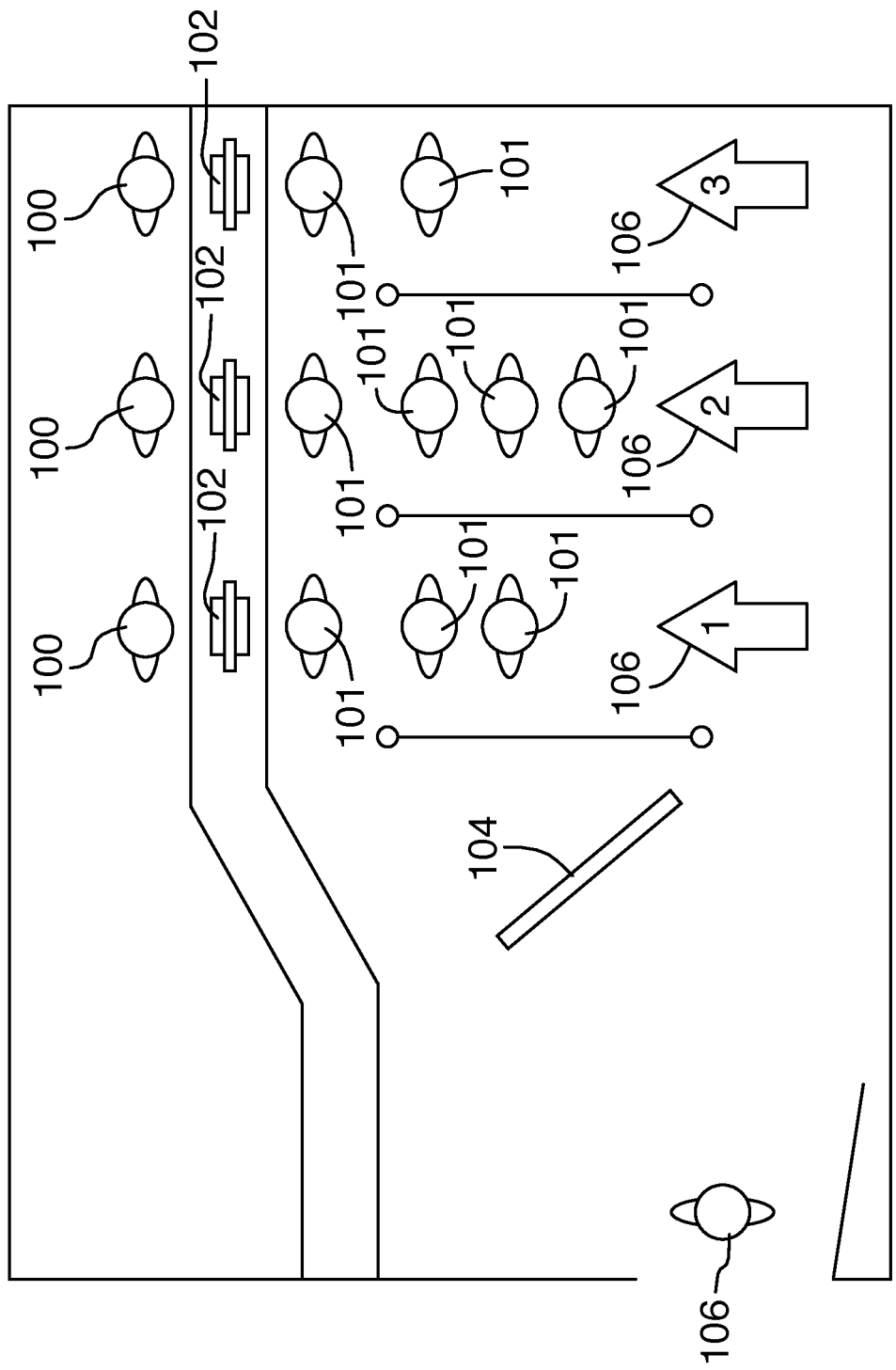
FIG. 4 a top view of the interior of the service establishment operating a preferred embodiment of the system.

FIG. 4 depicts the preferred embodiment of the system operating in a service establishment 200. A camera (i.e. top) view of the interior of the service establishment 200 is illustrated. This view represents the view as seen by a digital video camera 103 positioned and configured to capture video of the server queues 106.

Referring to FIG. 4, there are three servers 100, each operating an order input interface 102 to input orders from customers 101. Each server has a server queue 106 with multiple customers 101. There is also a public view monitor 104 facing the entrance of the service establishment 200 in view of a customer 101 entering the service establishment 200. The customer tracking processor 105 receives video from a digital video camera 103. The video may be from any perspective, including a top view. The customer tracking processor 105 then analyzes the video to identify servers 100 and customers 101 in the server queue. Once identified, the customer tracking processor 105 is then able to track customers 101 as they progress through the server queue 106 and calculate queue related metrics. The video may be displayed on the management monitor 300 with or without queue related metrics. For instance, the duration of time each customer 101 has been in a server queue 106 may be displayed by superimposing the metric on the video of the customers 101 in the queue 106.

The server queue related metrics include, at minimum, an expected wait time for each server queue. The expected wait time is calculated for each server queue. In the preferred embodiment, the expected wait time is the average order time for each customer multiplied by the number of customers in the server queue. In other embodiments, the expected wait time may be calculated differently. Other factors such as each customer's previous order history or the number of people accompanying each queued customer to the service establishment but not in a queue themselves may be incorporated into an expected wait time algorithm to better predict the expected wait time.

The customer tracking processor 105 may also be configured to calculate additional metrics including the:
1) number of customers in each server queue;
2) average order time for each customer;
3) each customer's wait time; and
4) duration of time each customer has been in one of the server queues.

Some or all of these metrics may be displayed on the public view monitor 104, the management monitor 300 or both.

The number of customers may be determined in various ways. The number of customers may be calculated by counting the number of identified customers in a queue or any other information that serves as a proxy for the number of customers. In the preferred embodiment, the number of customers is determined by simply counting the identified customers.

The average order time may be calculated for each customer in the server queue who ordered within a predetermined period of time. In the preferred embodiment, the order time is calculated as the duration between the time the customer reaches the head of the server queue and the time the customer's order is entered into the system.

The wait time may also be calculated for each individual customer in the queue. In the preferred embodiment, the customer wait time is calculated as the time the customer enters the server queue until the time the server take the customer's order and enters the order via the order input interface. In other embodiments, the customer wait time may be calculated differently. For instance, the customer wait time may be calculated as the time the customer is enters the server queue until the time the customer leaves the server queue.

The average customer wait time for each server queue may be calculated as the average of wait times for each individual customer in the server queue who ordered within a previous pre-determined period of time, such as 10, 15, 20, 30, 45 or 60 minutes or longer. In the preferred embodiment, the average customer wait time is calculated for all customers in the server queue who ordered within the last hour. Other preferred embodiments may use a different pre-determined period of time.

For service establishments with a drive-in queue, the expected vehicle wait time for each drive-in queue is calculated and displayed on an exterior monitor. In the preferred embodiment, the expected drive-in wait time for the drive-in queue 201 is calculated as the average drive-in order time for the drive-in queue 201 multiplied by the number of vehicles 202 in the drive-in queue 201. In other embodiments, the expected drive-in wait time may be calculated differently. Other factors such as each vehicle's previous order history, the number of passengers in each queued vehicle may be incorporated into an expected vehicle wait time algorithm to better predict the expected vehicle wait time.

The customer tracking processor 104 may also be configured to calculate additional drive-in queue related metrics including the:
1) the number of customers 101 in the drive-in queue 201;
2) an average drive-in order time for each customer 101 in the drive-in queue 201;
3) each vehicle's drive-in order time; and
4) the average vehicle wait time for each drive-in queue 201.

Some or all of these metrics may be displayed on the public view monitor, the management monitor or both the public view monitor and management monitor.

The number of vehicles may be determined in a number of ways. The number may be calculated by counting the number of identified vehicles in a queue or any other information that serves as a proxy for the number of vehicles. In the preferred embodiment, the number of customers is determined by counting the identified vehicles by analysis of video.

The average order time may be calculated for each customer in the drive-in queue who ordered within a pre-determined period of time. In the preferred embodiment, the order time is calculated as the duration between the time the customer's vehicle reaches the head of the drive-in queue and the time the customer's order is entered into the system.

The wait time for each drive-in customer may also be calculated. In the preferred embodiment, the customer wait time is calculated as the time the customer enters the drive-in queue until the time the server take the customer's order and enters the order via the order input interface. In other embodiments, the drive-in customer wait time may be calculated differently. For instance, the drive-in customer wait time may be calculated as the time the customer vehicle enters the server queue until the time the customer vehicle leaves the server queue.

The average vehicle wait time for each server queue is the average of the vehicle wait times for vehicles in the drive-in queue who ordered within a previous pre-determined period of time. In the preferred embodiment, the average vehicle wait time is calculated for customers in the server queue who order within the last hour. Other preferred embodiments may use a different predetermined period of time.

Generally, a computer, computer system, computing device, client or server, as will be well understood by a person skilled in the art, includes one or more than one electronic computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. It is the express intent of the inventors that a "processor" does not include a human; rather it is limited to be an electronic device, or devices, that perform digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.) Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed. Unless expressly stated or otherwise clearly implied herein, the conjunction "or" as used in the specification and claims shall be interpreted as a non-exclusive "or" so that "X or Y" is true when X is true, when Y is true, and when both X and Y are true, and "X or Y" is false only when both X and Y are false.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

The scope of the claims that follow is not limited by the embodiments set forth in the description. The claims should be given the broadest purposive construction consistent with the description and figures as a whole.

What is claimed is:

1. A system for managing performance of a service establishment, the service establishment having a plurality of servers and a plurality of customers therein, each server having a server queue containing zero or more customers, wherein the server takes an order from each customer in the server queue when the customer is at the head of the server queue, the system comprising:
    an order input interface for obtaining orders from the servers as the servers take orders from the customers;
    one or more digital video cameras positioned and configured to capture video of the server queues;
    a public view monitor viewable by the customers;
    a management monitor viewable by one or more managers of the service establishment; and
    a customer tracking processor comprising an artificial intelligence engine comprising a convolutional neural network trained with thousands of images of human heads taken from multiple views to recognize the heads of the customers, the customer tracking processor being configured to, for each server queue including at least one customer:
        receive video data from at least one of the digital video cameras of the server queue;
        identify, via the convolutional neural network, the head of each customer in the server queue by analysis of the video data;
        track each customer's progress in the server queue by analysis of the video data by repeatedly identifying the customer's head as the customer progresses in the queue;
        calculate expected wait time for the server queue;
        display the expected wait time on the public view monitor; and
    calculate, for each individual customer in one of the server queues, based in the movement of the customer's head while the customer is in the queue, the customer's wait time from the time the customer enters the server queue until the time the server takes the customer's order and enters the order via the order input interface,
    wherein the customer tracking processor is further configured to calculate, for each server queue, by analyzing the video data showing the server queue, the number of customers in the server queue, and an average order time for each customer in the server queue who has ordered within a previous predetermined period of time, wherein the order time is the duration between the time the customer reaches the head of the server queue and the time the customer's order is entered into the system, and wherein the expected wait time for a server queue is calculated as the average order time for the server queue multiplied by the number of customers in the server queue and further wherein the customer tracking processor is further configured to display on the public view monitor the number of customers in each server queue.

2. The system of claim 1, wherein the customer tracking processor is further configured to:
    calculate the average customer wait time for each server queue as the average of the customer wait times for customers in the server queue who ordered within a previous pre-determined period of time; and
    display the average customer wait time for each server queue on the management monitor.

3. The system of claim 1, wherein for a first customer at the head of a server queue with a second customer immediately behind the first customer in the server queue, the time the server takes the first customer's order and enters the order via the order input interface is deemed to be the time that the second customer reaches the head of the server queue.

4. The system of claim 1, wherein the customer tracking processor is further configured to display, on the management monitor, video of the customers in the server queues received from the digital video cameras, and, for each customer, the duration of time that the customer has been in one of the server queues.

5. The system of claim 1, wherein the service establishment comprises a restaurant and a drive-in queue located outside of and proximate to the restaurant, wherein a drive-in order station is located proximate to the head of the drive-in queue, the drive-in order station having a drive-in cashier located therein, the drive-in queue having a plurality of vehicles queued therein, each vehicle having a driver, wherein when each vehicle reaches the head of the drive-in queue the drive-in cashier takes a food order from the driver of the vehicle and enters the food order via the order input interface, wherein the system further comprises:
- a drive-in video camera positioned and configured to capture drive-in video data of the vehicles in the drive-in queue and provide the drive-in video data to the customer tracking processor; and
- an exterior monitor viewable by drivers of vehicles approaching the service establishment prior to entering the drive-in queue,
- wherein the customer tracking processor is further configured to:
- receive drive-in video data from the drive-in video camera of the drive-in queue;
- track each vehicle's progress in the drive-in queue by analysis of the drive-in video data;
- calculate an expected drive-in wait time for the drive-in queue; and
- display the expected drive-in wait time on the exterior monitor; and
- display on the exterior monitor the expected drive-in wait time for the server queues.

6. The system of claim 5, wherein the customer tracking processor is further configured to calculate, by analyzing the drive-in video data, the number of vehicles in the drive-in queue, and an average drive-in order time for each vehicle in the drive-in queue whose driver ordered within a previous predetermined period of time, wherein the drive-in order time is the duration between the time the vehicle reaches the head of the drive-in queue and the time the driver's order is entered into the system, and wherein the expected drive-in wait time for the drive-in queue is calculated as the average drive-in order time for the drive-in queue multiplied by the number of vehicles in the drive-in queue.

7. The system of claim 5, wherein the customer tracking processor is further configured to:
- for each vehicle in the drive-in queue, calculate, by analysis of the drive-in video data, the vehicle's drive-in wait time from the time the vehicle enters the drive-in queue until the drive-in cashier takes the food order of the driver of the vehicle and enters the food order via the order input interface;
- calculate the average drive-in wait time for vehicles whose drivers ordered within a previous predetermined period of time; and
- display on the management monitor the average drive-in wait time for the drive-in queue and the average drive-in wait time for vehicles.

8. The system of claim 1 wherein the system further comprises a rules-based recommendations engine wherein the recommendations engine is configured to recommend to restaurant managers adjusting staffing levels to achieve a target average wait time.

9. The system of claim 1 wherein the service establishment is a quick serve restaurant.

10. The system of claim 1 wherein the service establishment is a retail store.

* * * * *